(12) United States Patent
Fukatsu et al.

(10) Patent No.: US 9,663,160 B2
(45) Date of Patent: May 30, 2017

(54) TOWING TRACTOR (71) Applicant: KABUSHIKI KAISHA TOYOTA JIDOSHOKKI, Kariya-shi, Aichi-ken (JP)

(72) Inventors: Fumihiro Fukatsu, Aichi-ken (JP); Takaaki Takenaka, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 15/015,751

(22) Filed: Feb. 4, 2016

(65) Prior Publication Data
US 2016/0229469 A1 Aug. 11, 2016

(30) Foreign Application Priority Data

Feb. 6, 2015 (JP) .................................. 2015-021825

(51) Int. Cl.
| | |
|---|---|
| B62D 49/08 | (2006.01) |
| B62D 21/12 | (2006.01) |
| B62D 49/00 | (2006.01) |
| B62D 63/02 | (2006.01) |
| B60K 1/04 | (2006.01) |
| B60K 5/00 | (2006.01) |
| B60K 17/00 | (2006.01) |
| B62D 21/18 | (2006.01) |

(52) U.S. Cl.
CPC .............. *B62D 49/085* (2013.01); *B60K 1/04* (2013.01); *B60K 5/00* (2013.01); *B60K 17/00* (2013.01); *B62D 21/12* (2013.01); *B62D 21/18* (2013.01); *B62D 49/007* (2013.01); *B62D 63/025* (2013.01); *B60K 2001/0416* (2013.01)

(58) Field of Classification Search
CPC .................................. B62D 49/085; E02F 9/18
See application file for complete search history.

(56) References Cited

U.S. PATENT DOCUMENTS

| | | | |
|---|---|---|---|
| 4,173,264 A | 11/1979 | Erker et al. | |
| 7,841,423 B2 * | 11/2010 | Damm ................. | E02F 3/7604 |
| | | | 172/611 |
| 8,641,065 B2 | 2/2014 | Uno | |
| 2002/0162224 A1 | 11/2002 | Gabbianelli et al. | |
| 2009/0066046 A1 * | 3/2009 | Takemura ............... | B60G 9/02 |
| | | | 280/32.5 |
| 2011/0108337 A1 | 5/2011 | Uno | |

FOREIGN PATENT DOCUMENTS

| | | |
|---|---|---|
| JP | 2002-003188 A | 1/2002 |
| JP | 2008-063113 A | 3/2008 |
| JP | 2011-098672 A | 5/2011 |

OTHER PUBLICATIONS

Communication dated Jun. 30, 2016, issued by the European Patent Office in corresponding European Application No. 16154023.2.

* cited by examiner

*Primary Examiner* — Erez Gurari (74) *Attorney, Agent, or Firm* — Sughrue Mion, PLLC (57) ABSTRACT

A towing tractor includes a frame, a counterweight that is connected to a rear part of the frame, and a plurality of component parts supported by the frame. The frame includes a plurality of frame assemblies that are connected to each other by bolts. Each frame assembly includes a plurality of frame members. Each frame member is selected according to the component parts, from a plurality of members to be selected that is different from each other in at least one of dimensions in a longitudinal direction and a width direction of the frame.

3 Claims, 9 Drawing Sheets

TOWING TRACTOR

BACKGROUND OF THE INVENTION

The present invention relates to a towing tractor.

Japanese Unexamined Patent Application Publication No. 2011-98672 discloses a towing tractor that includes a frame extending in the longitudinal direction of the towing tractor and a counterweight connected to a rear part of the frame.

Among towing tractors of such type, some towing tractors are driven by an engine, and some others are driven by an electric motor. The motor-driven towing tractors include a type in which the driver's seat is positioned in the front part of the towing tractor and another type in which the driver's seat is disposed in the rear part of the towing tractor. The towing tractors of these types have been used widely in the airports and other places in accordance with the usage or preferences peculiar to the place where the towing tractor is used.

Conventionally, the frames for use in the towing tractors have been manufactured in various forms according to the type of the towing tractor, so that the designing, manufacturing and improvement of the towing tractors have involved many man-hours and time. Furthermore, because the frames for the towing tractors are generally long, large manufacturing facilities are required for manufacturing of the respective frames. This hinders reduction in the manufacturing cost of the conventional towing tractors.

Furthermore, the frames for the towing tractors have been made by connecting a plurality of various frame members by welding, which requires high skill and a long time. Such factor also makes it difficult to reduce the manufacturing cost of the conventional towing tractors. The strength of welded connection of the frame members may not be well controlled and, therefore, it is difficult to maintain the desired quality of the frames and hence the quality of the towing tractors.

The present invention which has been made in view of the above circumstances is directed to providing a towing tractor that enables reduction in the manufacturing cost while maintaining desired quality.

SUMMARY OF THE INVENTION

In accordance with an aspect of the present invention, there is provided a towing tractor that includes a frame, a counterweight that is connected to a rear part of the frame, and a plurality of component parts supported by the frame. The frame includes a plurality of frame assemblies that are connected to each other by bolts. Each frame assembly includes a plurality of frame members. Each frame member is selected according to the component parts, from a plurality of members to be selected that is different from each other in at least one of dimensions in a longitudinal direction and a width direction of the frame.

Other aspects and advantages of the invention will become apparent from the following description, taken in conjunction with the accompanying drawings, illustrating by way of example the principles of the invention.

DETAILED DESCRIPTION OF THE EMBODIMENTS

The following will describe first to third embodiments of the present invention with reference to the accompanying drawings.

First Embodiment

Figure 1:
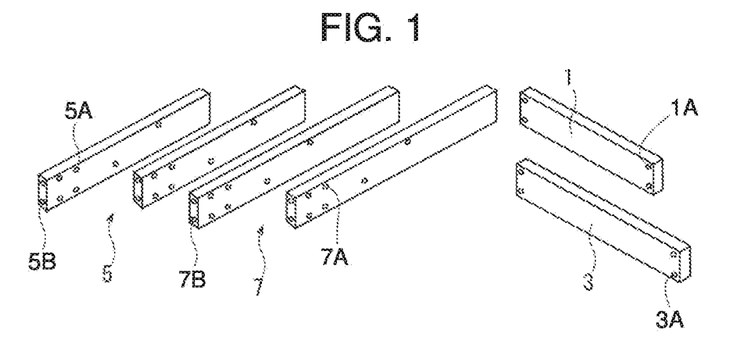
FIG. 1 is a perspective view showing selective frame members that are used selectively for a front frame assembly of a towing tractor according to first to third embodiments of the present invention.
Figure 5:
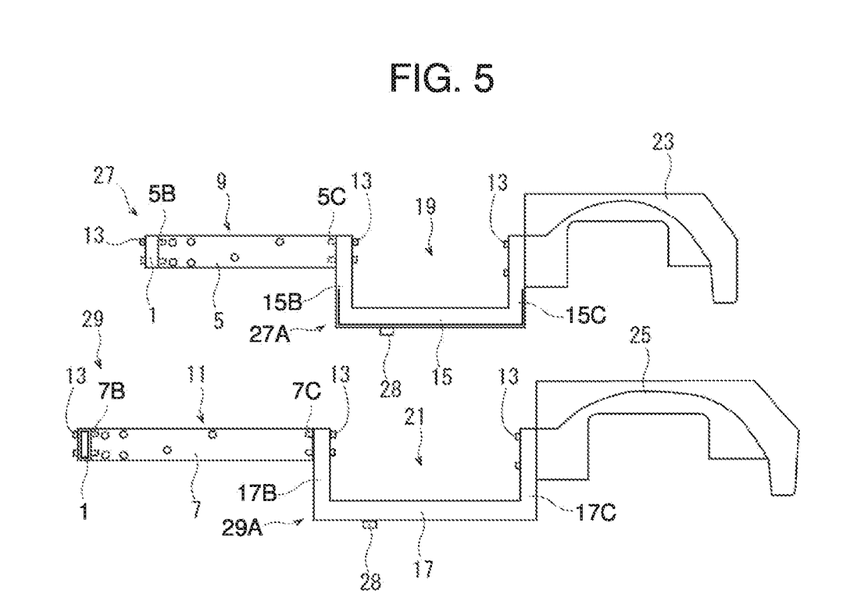
FIG. 5 is a perspective view of two different platforms of the towing tractor according to the first to third embodiments of the present invention.

An engine-driven towing tractor according to the first embodiment of the present invention will now be described in connection with manufacturing of the towing tractor. Referring to FIG. 1, a plurality of first frame members 1, a plurality of second frame members 3, a plurality of third frame members 5, and a plurality of fourth frame members 7 are prepared in a vehicle assembly shop. The first to fourth frame members 1, 3, 5, and 7 are the frame members of the present invention that are used selectively to constitute first or second front frame assembly 9 or 11 that are shown in FIG. 5. The first and second frame members 1 and 3 correspond to the first members to be selected of the present invention and the third and fourth frame members 5 and 7 correspond to the second members to be selected of the present invention. As shown in FIG. 1, the first to fourth frame members 1, 3, 5, and 7 are elongated plate members made of steel.

The first frame member 1 has therethrough in each of the opposite end portions thereof a pair of bolt holes 1A formed one above the other as viewed in FIG. 1. The pairs of the upper bolt holes 1A and the lower bolt holes 1A are spaced from each other in the width direction of the first frame member 1. Each bolt hole 1A is formed through the first frame member 1 in the thickness direction thereof.

The second frame member 3 has substantially the same width and thickness as the first frame member 1, but is longer than the first frame member 1. Therefore, the provision of pluralities of the first and second frame members 1, 3 provides for variations in the width dimension of the towing tractor. The second frame member 3 also has at a position adjacent to each of the opposite ends thereof a pair of bolt holes 3A that is similar to the bolt holes 1A of the first frame members 1. The positions of the upper and lower bolt holes 1A of the first frame members 1 correspond to the positions of the upper lower bolt holes 3A of the second frame members 3, respectively.

Figure 2:
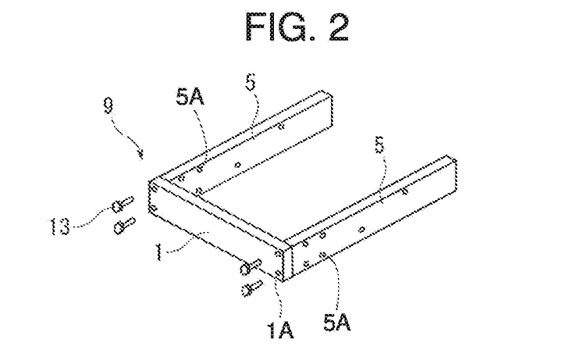
FIG. 2 is a perspective view of the front frame assembly of the towing tractor according to the first to third embodiments of the present invention.

Each third frame member 5 has therethrough in one end portion thereof a plurality of bolt holes 5A, four bolt holes 5A in the illustrated embodiment. Additionally, each third frame member 5 has therein at one end surface thereof a pair of bolt holes 5B formed one above the other. The bolt holes 5B are formed in the third frame members 5 at such positions that allow the bolt holes 5B to be in alignment with the bolt holes 1A of the first frame members 1 or the bolt holes 3A of the second frame members 3 when the third frame member 5 is combined with the first frame member 1 or the second frame member 3 as shown in FIG. 2. Furthermore, as shown in FIG. 5, each third frame member 5 has therein at the other end surface thereof a plurality of bolt holes 5C that are similar to the bolt holes 5B.

As shown in FIG. 1, the fourth frame members 7 have substantially the same width and thickness as the third frame members 5, but are longer than the third frame members 5. The provision of pluralities of the third and fourth frame members 5, 7 provides for variations in the longitudinal dimension of the towing tractor. Each fourth frame member 7 has therethrough in one end portion thereof a plurality of bolt holes 7A that are similar to the bolt holes 5A of the third frame members 5. Additionally, each fourth frame member 7 has therein at the opposite end surfaces thereof a pair of bolt holes 7B, 7C, respectively, that are similar to the bolt holes 5B and 5C of the third frame members 5 (FIG. 5). The positions of the bolt holes 5A of the third frame members 5 correspond to the positions of the bolt holes 7A of the fourth frame members 7.

As shown in FIG. 2, one first frame member 1 and two third frame members 5 are selected. The first frame member 1 is connected to the third frame members 5 by bolts 13 inserted through the bolt holes 1A and in the bolt holes 5B. The bolts 13 are tightened to a specified torque. The first frame member 1 and the third frame members 5 are thus assembled into the first front frame assembly 9.

Figure 3:
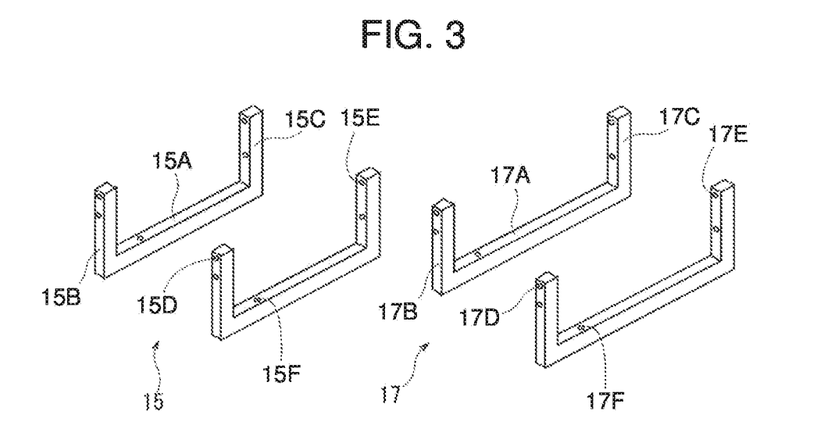
FIG. 3 is a perspective view of a plurality of selective frame members that are used selectively for a center frame assembly of the towing tractor according to the first to third embodiments of the present invention.

As shown in FIG. 3, a plurality of pairs of fifth frame members 15 and a plurality of pairs of sixth frame members 17 are prepared in the vehicle assembly shop. For the sake of the description of the embodiment, FIG. 3 shows one pair of fifth frame members 15 and one pair of sixth frame members 17, respectively. The fifth frame members 15 and the sixth frame members 17 are the selective frame members that are used selectively to constitute first and second center frame assembly 19 or 21 that are shown in FIG. 5. As shown in FIG. 3, the fifth frame members 15 and the sixth frame members 17 are made of steel.

Each fifth frame member 15 has a main portion 15A extending in the longitudinal direction of the fifth member 15, a front connecting portion 15B extending upward from the front end of the main portion 15A, and a rear connecting portion 15C extending upward from the rear end of the main portion 15A. The front connection portion 15B has therethrough a pair of bolt holes 15D that are formed one above the other and extending in the front connecting portion 15B. The bolt holes 15D are formed through the front connection portion 15B at such positions that allow the bolt holes 15D to be in alignment with the bolt holes 5C of the third frame members 5 when the third frame members 5 are combined with the fifth frame member 15 as shown in FIG. 5. The rear connecting portion 15C of each fifth frame member 15 has therethrough a pair of bolt holes 15E that are formed one above the other and extending in the longitudinal direction of the fifth member 15. The main portion 15A of each fifth frame member 15 has therethrough in the front part thereof a bolt hole 15F extending vertically.

Each sixth frame member 17 has a main portion 17A extending in the longitudinal direction of the sixth frame member 17, a front connecting portion 17B extending upward from the front end of the main portion 17A, and a rear connecting portion 17C extending upward from the rear end of the main portion 17A. The main portion 17A has substantially the same thickness as the main portion 15A of the fifth frame member 15, but is longer than the main portion 15A. As in the case of the third and fourth frame members 5 and 7, the provision of pluralities of the fifth and the sixth frame members 15 and 17 provides for variations in the longitudinal direction of the towing tractor. Therefore, it is possible to provide variations in the longitudinal dimension of the towing tractor. The front connecting portions 15B and the front connecting portions 17B have substantially the same length and the thickness. The rear connecting portions 15C and the rear connecting portions 17C also have substantially the same length and the thickness. The front connecting portion 17B has two bolt holes 17D that are similar to the bolt holes 15D of the front connecting portions 15B. The rear connecting portion 17C has two bolt holes 17E that are similar to the bolt holes 15E of the front connecting portions 15B. The main portion 17A also has in the front part thereof a bolt hole 17F that is similar to the bolt hole 15F of the main portions 15A. The bolt holes 17D of the front connecting portions 17B of the sixth frame members 17 correspond to the bolt holes 15D of the front connecting portions 15B of the fifth frame members 15. The bolt holes 17E of the rear connecting portions 17C of the sixth frame members 17 correspond to the bolt holes 15C of the rear connecting portions 15C of the fifth frame members 15.

Figure 4:
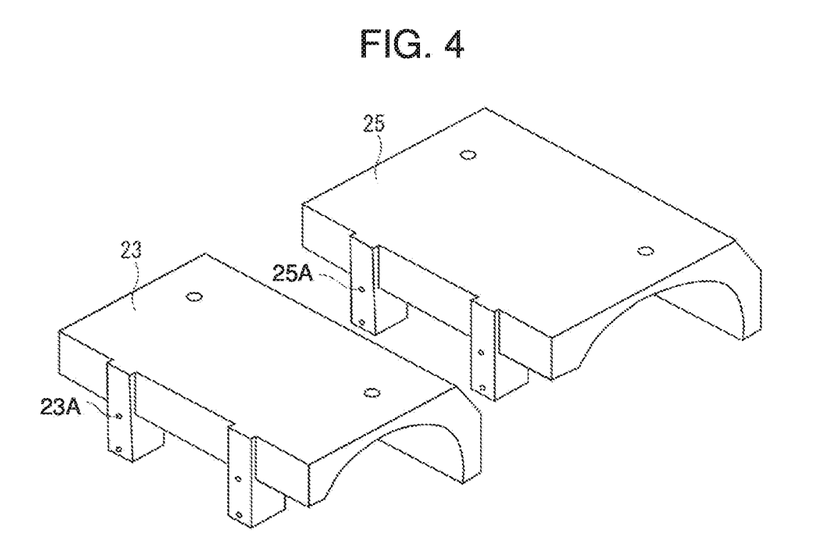
FIG. 4 is a perspective view of two different counterweights of the towing tractor according to the first to third embodiment of the present invention.

Furthermore, as shown in FIG. 4, a plurality of first counterweights 23 (only one first counterweight 23 being shown in the drawing) and a plurality of second counterweight 25 (only one second counterweight 25 being shown in the drawing) are prepared in the assembly shop. The first and second counterweights 23 and 25 are made of casing and finished by machining.

Each first counterweight 23 has at the front thereof two pairs of bolt holes 23A at two different positions spaced in the width direction of the towing tractor. The bolt holes 23A of each pair are formed one above the other and extending in the longitudinal direction of the towing tractor. The bolt holes 23A are formed in the first counterweight 23 at such positions that allow the bolt holes 23A to be in alignment with the bolt holes 15E of the fifth frame members 15 when the fifth frame members 15 are combined with the first counterweight 23 as shown in FIG. 5.

Each second counterweight 25 has substantially the same width and thickness as the first counterweights 23, but is longer than the first counterweight 23 in the longitudinal direction of the towing tractor. As in the case of the third and fourth frame members 5 and 7 and the fifth and sixth frame members 15 and 17, the provision of pluralities of the counterweights 23, 25 provides for variations in the longitudinal dimension of the towing tractor. Each second counterweight 25 also has bolt holes 25A that are formed in the same manner as the bolt holes 23A of the first counterweight 23. The positions of each pair of upper and lower bolt holes 23A of the first counterweight 23 correspond to the positions of the upper and lower bolt holes 25A of the second counterweight 25.

The following will describe an example of procedure for manufacturing an engine-driven towing tractor. Firstly, one first front frame assembly 9, two fifth frame members 15, and one first counterweight 23 are selected. As shown in FIG. 5, the fifth frame members 15 are connected and fastened to the first front frame assembly 9 by the bolts 13 inserted through the bolt holes 15D of the front connecting members 15B and screwed into the bolt holes 5C of the first front frame assembly 9. At this time, the bolts 13 are tightened to a specified torque. Subsequently, the assembly of the first front frame assembly 9 and two fifth frame members 15 are connected to the first counterweight 23 by the bolts 13 inserted through the bolt holes 15E of the rear connection portions 15C of the fifth frame members 15 and screwed into the bolt holes 23A of the first counterweight 23. At this time, the bolts 13 are tightened to a specified torque. As shown in FIG. 5, a reinforcing member 28 is fixed to the bottom of the main portions 15A of the respective fifth frame members 15 by the bolts 13 inserted into the bolt holes 15F (not shown). At this time, the bolts 13 are tightened to a specified torque. In this way, a first platform 27 is assembled, as shown in FIG. 5. The first platform 27 includes a first frame 27A formed by the first front frame assembly 9 and the first center frame assembly 19 that are connected to each other by the bolts 13, and the first counterweight 23 that is connected to the rear part of the first frame 27A by the bolts 13.

Figure 6:
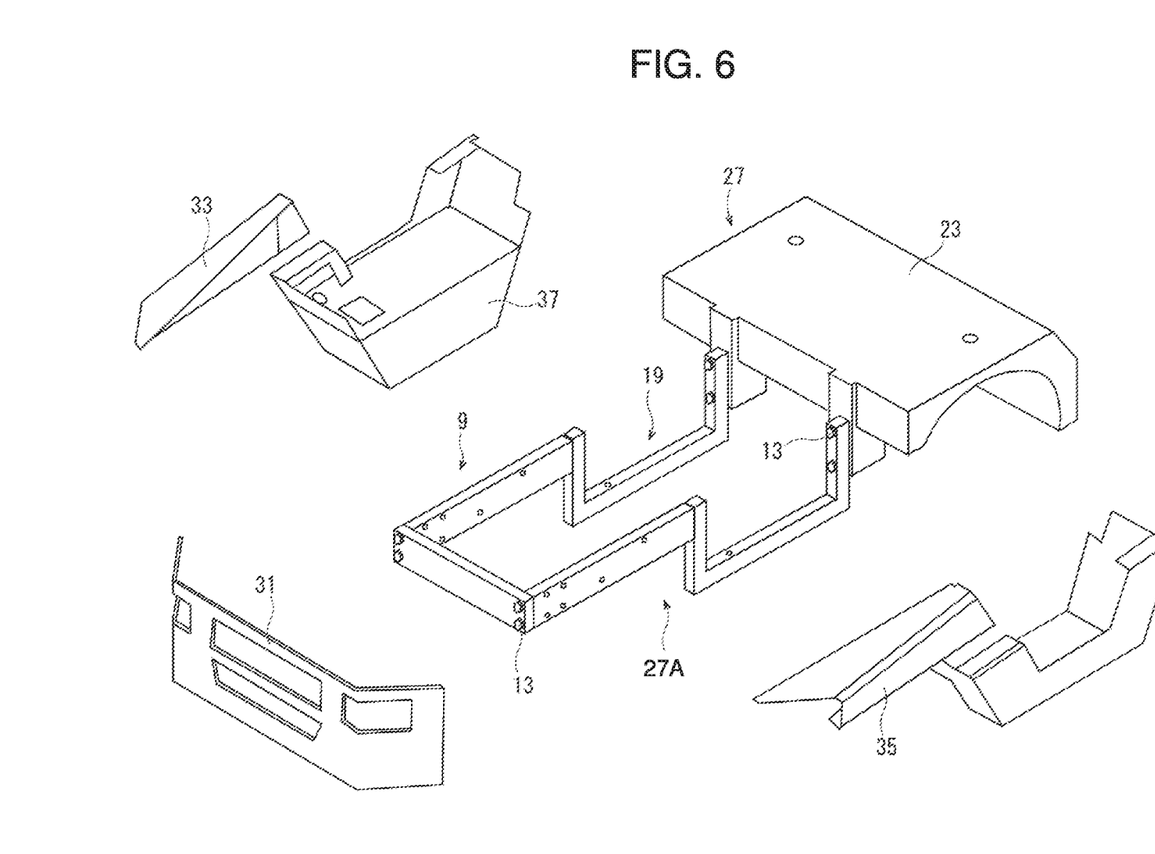
FIG. 6 is an exploded perspective view of one of the two platforms of FIG. 5 and its related parts to be mounted to the platforms.
Figure 7:
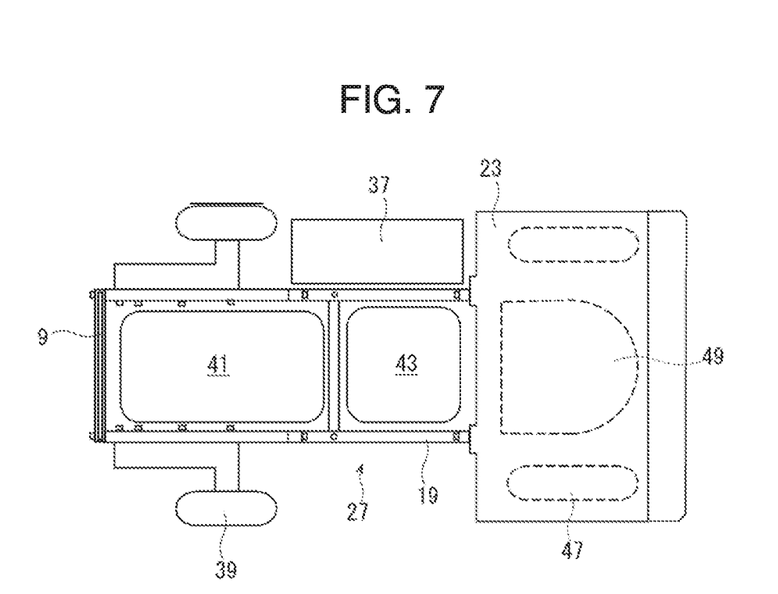
FIG. 7 is a plan view of the towing tractor in the manufacturing process according to the first embodiment of the present invention that is yet to be completed.
Figure 8:
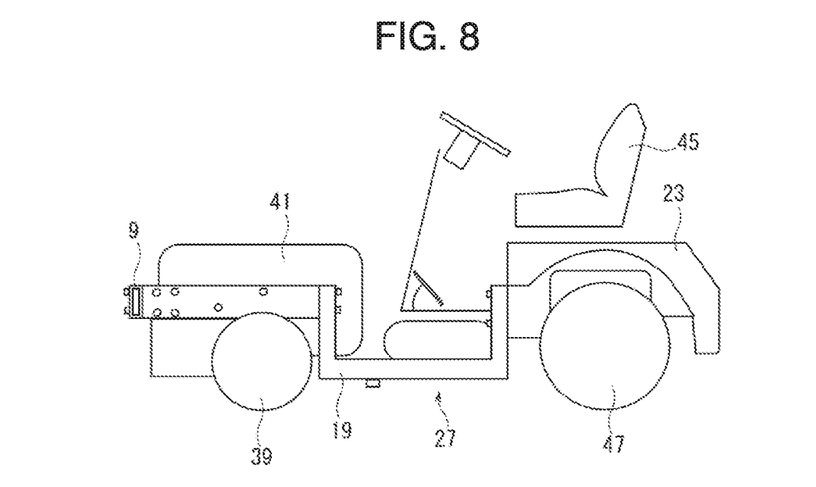
FIG. 8 is a side view of the towing tractor of FIG. 7.
Figure 9:
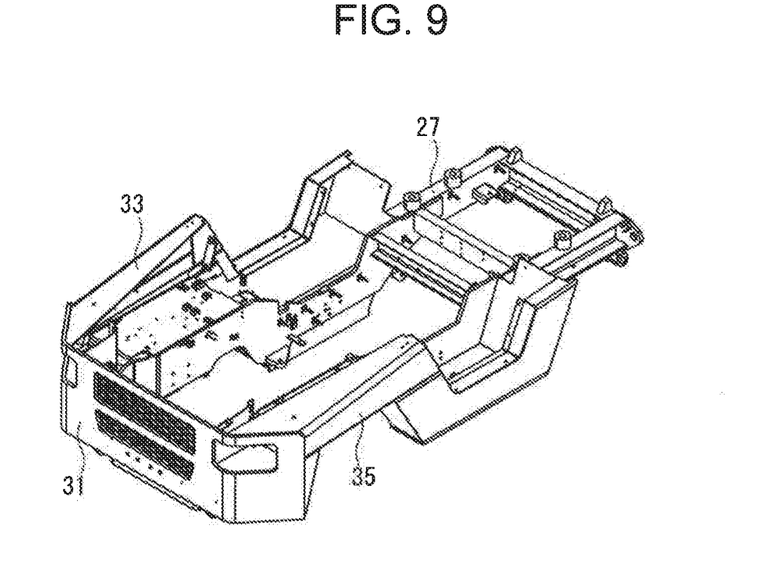
FIG. 9 is a perspective view of the towing tractor in the manufacturing process according to the first embodiment of the present invention that is yet to be completed.
Figure 10:
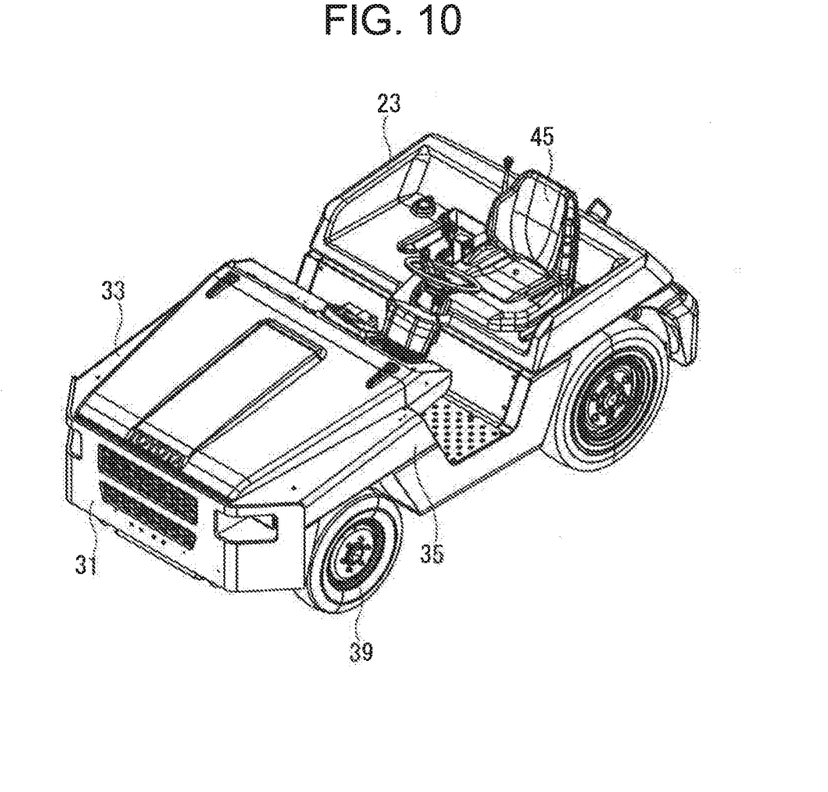
FIG. 10 is a perspective view of the towing tractor according to the first embodiment of the present invention that has been substantially completed.
Figure 11:
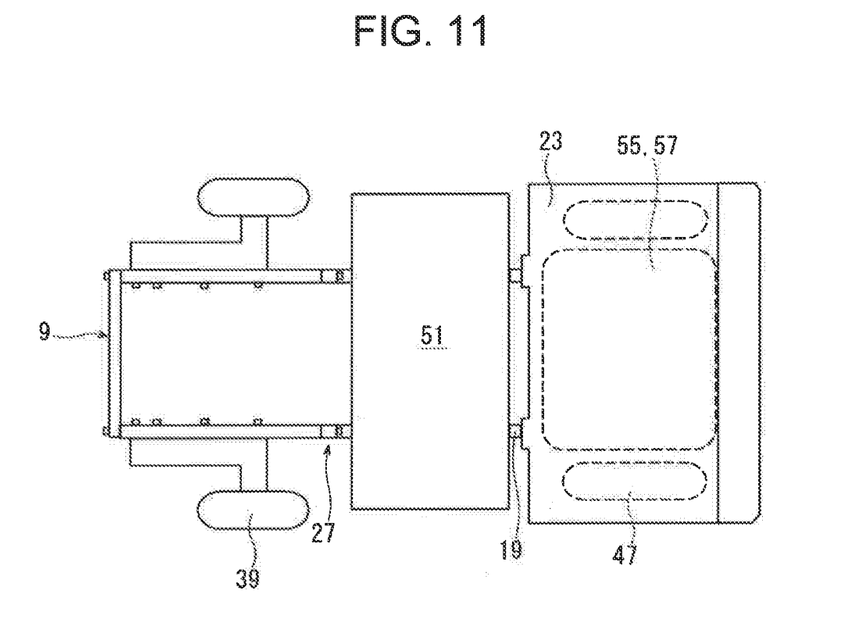
FIG. 11 is a plan view of a towing tractor in the manufacturing process according to the second embodiment of the present invention that is yet to be completed.
Figure 12:
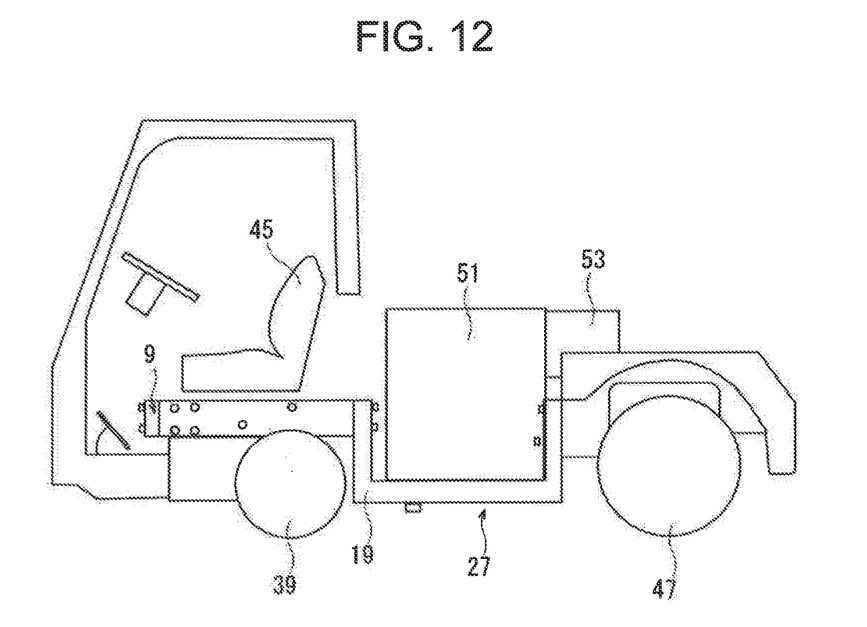
FIG. 12 is a side view of the towing tractor of FIG. 11.
Figure 13:
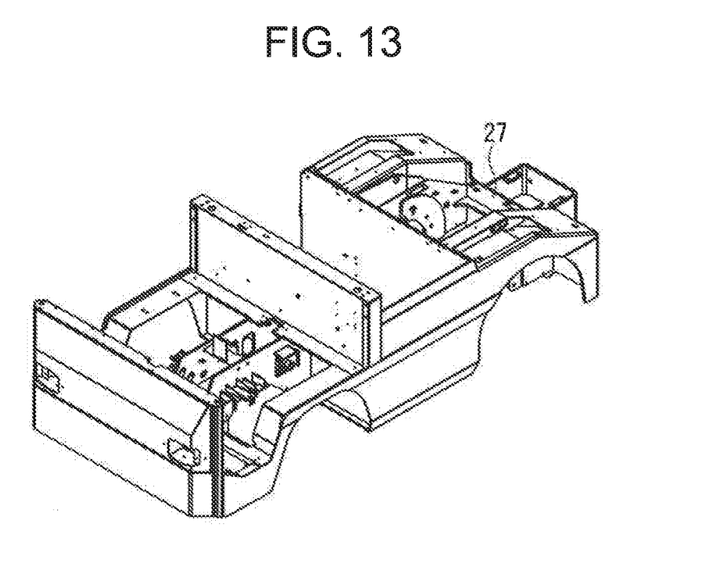
FIG. 13 is a perspective view of the towing tractor in the manufacturing process according to the second embodiment of the present invention that is yet to be completed.
Figure 14:
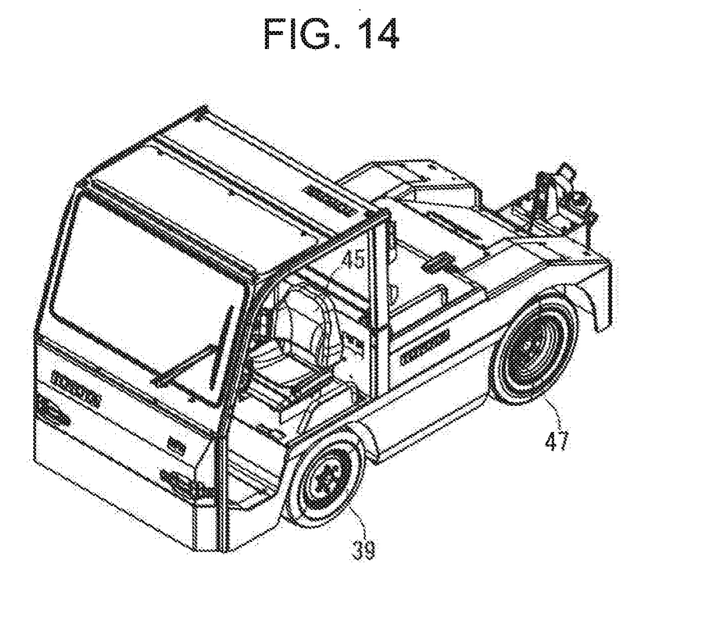
FIG. 14 is a perspective view of the towing tractor according to the second embodiment of the present invention that has been substantially completed.
Figure 15:
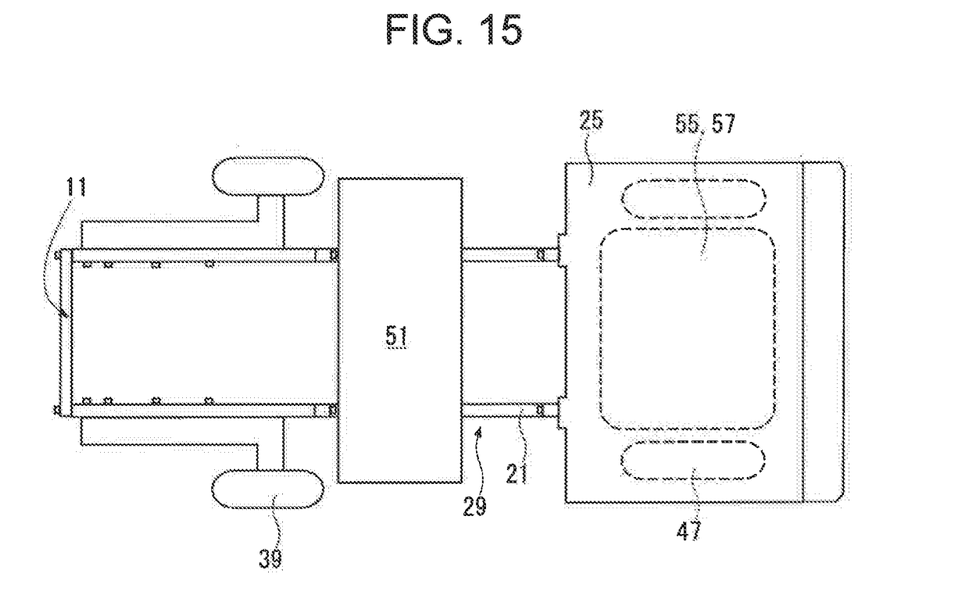
FIG. 15 is a plan view of a towing tractor in the manufacturing process according to the third embodiment of the present invention that is yet to be completed.
Figure 16:
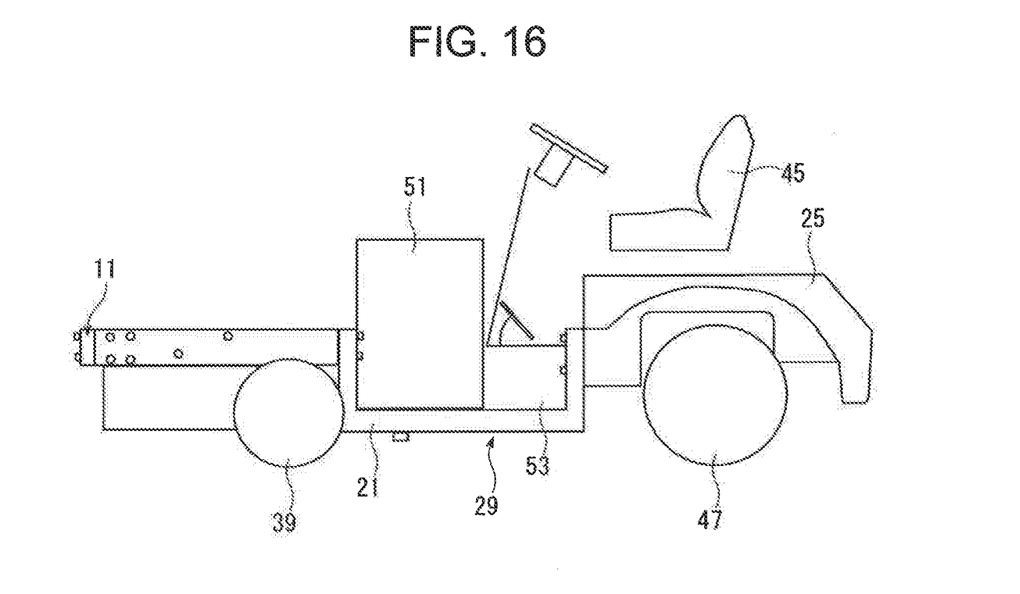
FIG. 16 is a side view of the towing tractor of FIG. 15.
Figure 17:
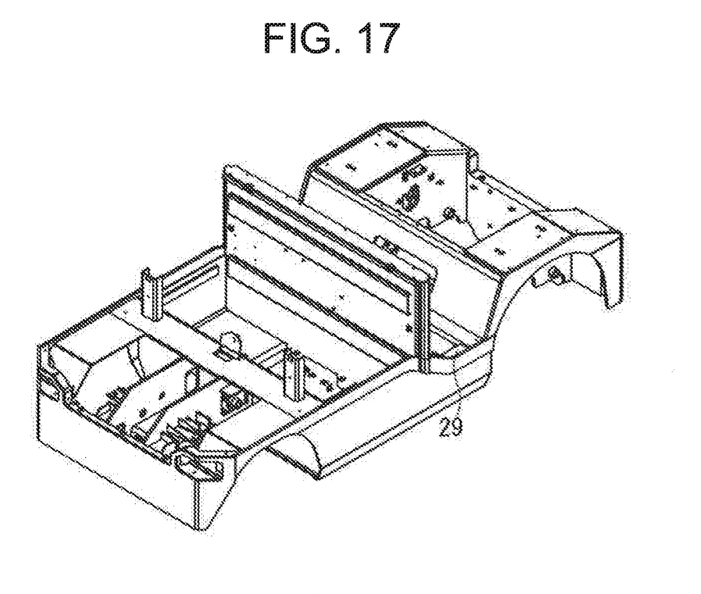
FIG. 17 is a perspective view of the towing tractor in the manufacturing process according to the third embodiment of the present invention that is yet to be completed.
Figure 18:
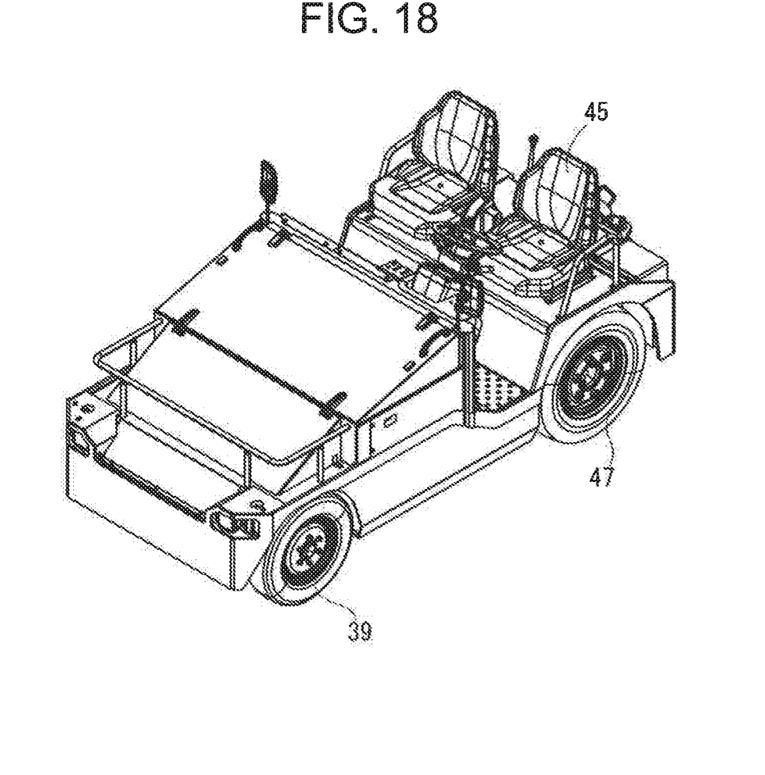
FIG. 18 is a perspective view of the towing tractor according to the third embodiment of the present invention that has been substantially completed.

As shown in FIG. 6, the first platform 27 is assembled with a front guard 31, a right fender 33, a left fender 35, and a fuel tank 37. Specifically, as shown in FIGS. 7 to 10, the right and left front wheels 39 and an engine 41 are supported by the first front frame assembly 9. A transmission 43 and the fuel tank 37 that should be mounted at a position in the towing tractor as low as possible are supported by the first center frame assembly 19. A seat 45, right and left rear wheels 47, and a rear axle 49 are supported by the first counterweight 23. In this way the towing tractor that is driven by the engine 41 is completed.

Second Embodiment

A procedure for manufacturing a towing tractor according to the second embodiment of the present invention will now be described. The towing tractor according to the second embodiment has a driver's seat in the front part of the towing tractor. The first plat form 27 shown in FIG. 5 is also used in the towing tractor according to the second embodiment. As shown in FIGS. 11 to 14, the towing tractor of the second embodiment is so configured that right and left front wheels 39 and the seat 45 are supported by the first front frame assembly 9, a battery 51 is supported by the first center frame assembly 19 and a controller 53, the right and left rear wheels 47, a motor 55, and a rear axle 57 are supported by the first counterweight 23. In this way the towing tractor according to the second embodiment is completed.

Third Embodiment

A procedure for manufacturing a towing tractor according to the third embodiment will now be described. The towing tractor according to the third embodiment has a driver's seat in the rear part of the towing tractor. For that purpose, one first frame member 1 and two fourth frame members 7 (FIG. 1) are selected. The first frame member 1 corresponds to the first frame member to be selected of the present invention and the fourth frame members 7 correspond to the second frame member to be selected of the present invention. The first frame member 1 is connected to the fourth frame members 7 by the bolts 13 inserted through the bolt holes 1A of the first frame member 1 and screwed into the bolt holes 7B of the fourth frame members 7. At this time, the bolts 13 are tightened to a specified torque. In this way, the second front frame assembly 11 is completed.

Subsequently, one second front frame assembly 11, two sixth frame members 17, and one second counterweight 25 are selected. The sixth frame members 17 are connected to the second front frame assembly 11 by the bolts 13 inserted through the bolt holes 17D in the front connecting portions 17D of the sixth frame members 17 and screwed into the bolt holes 7C in the fourth frame members 7 of the second front frame assembly 11. The bolts 13 are tightened to a specified torque. Then, the sixth frame members 17 are connected to the second counterweight 25 by the bolts 13 inserted into the bolt holes 17E of the rear connecting portions 17C of the sixth frame members 17 and screwed into the bolt holes 25E of the second counterweight 25. At this time, the bolts 13 are tightened to a specified torque. The reinforcing member 28 is fixed to the bottom of the main portions 17A of the respective sixth frame members 17 by the bolts 13 (not shown) inserted into the bolt holes 17F. At this time, the bolts 13 are tightened to a specified torque. In this way a second platform 29 is completed. The second platform 29 includes a second frame 29A formed by the second front frame assembly 11 and the second center frame assembly 21 that are connected to each other by the bolts 13, and the second counterweight 25 that is connected to the rear part of the second frame 29A by the bolts 13.

As shown in FIGS. 15 to 18, the right and left front wheels 39 are supported by the second front frame assembly 11. The battery 51 and the controller 53 are supported by the second center frame assembly 21. The seat 45, the right and left rear wheels 47, the motor 55, and the rear axle 57 are supported by the second counterweight 25. In this way the towing tractor according to the third embodiment is completed.

In the case of manufacture of a towing tractor with a large vehicle width, the second frame members 3 may be used alternatively to the first frame members 1, and a reinforcing member that is relatively longer than the reinforcing member 28 may alternatively be used. In this case, it is possible to provide variations in the width dimension of the towing tractor.

The first frame member 1 is used as a common frame member in three different towing tractors according to the first to third embodiments and, therefore, it is possible to reduce man-hours and time for designing, manufacturing, and improvements of the towing tractors.

The first and second front frame assemblies 9, 11, the first and second center frame assemblies 19, 21, and the first and second counterweights 23, 25 are shorter than the first and second platforms 27, 29. The first and second front frame assemblies 9, 11 and the first and second center frame assemblies 19, 21 are shorter than the first and second frames 27A, 29A. According to the towing tractors of the first to third embodiments, therefore, it is possible to reduce the size of the manufacturing facilities for the frames of the towing tractors configured by such frame members of the dimensions. The first to sixth frame members 1, 3, 5, 7, 15, 17 are especially easy to handle. Accordingly, it is possible to manufacture the towing tractors of various forms easily and reduce the size of the manufacturing facilities.

According to the towing tractors of the first to third embodiments, the first and second front frame assemblies 9, 11 are formed by connecting one of the first frame member 1 and the second frame member 3 to one of a pair of the third frame members 5 and a pair of the fourth frame members 7 by the bolts 13. Then, the first and second front frame assemblies 9, 11 are connected to one of the first center frame assembly 19 and the second center frame assembly 21 by the bolts 13. Therefore, no special skill is required for the connecting work of the frame members and the frame assemblies, reducing the time for connecting and assembling work. The strength of the connection is secured by the bolts 13 are that are tightened to the respective specified torques. The first and second counterweights 23, 25 are connected to one of the first frame 27A and the second frame 29A by the bolts 13.

According to the towing tractors of the first to third embodiment, therefore, it is possible to reduce the cost for the manufacturing while maintaining the desired qualities.

Although the present invention has been described in the context of the first to third embodiments, it may variously be modified within the scope of the invention.

The present invention is applicable to a towing tractor.

What is claimed is:

1. A towing tractor comprising:
a frame that includes a front frame assembly and a center frame assembly, wherein the center frame assembly is connected to a rear part of the front frame assembly by bolts;
a counterweight that is connected to a rear part of the center frame assembly by bolts, and
a plurality of component parts supported by the frame, wherein
each of the front frame assembly and the center frame assembly includes a pair of right and left frame members that is selected from among a plurality of pairs of right and left selective frame members that have different lengths and have bolt holes located at a same position in a width direction thereof,
wherein the component parts include front wheels, a seat, an engine, a transmission, a fuel tank, rear wheels, and a rear axle,
the front frame assembly supports at least the front wheels and the engine, and
the center frame assembly supports the transmission and the fuel tank, and,
the counterweight supports the seat, the rear wheels, and the rear axle.

2. A towing tractor comprising:
a frame that includes a front frame assembly and a center frame assembly, wherein the center frame assembly is connected to a rear part of the front frame assembly by bolts;
a counterweight that is connected to a rear part of the center frame assembly by bolts, and
a plurality of component parts supported by the frame, wherein
each of the front frame assembly and the center frame assembly includes a pair of right and left frame members that is selected from among a plurality of pairs of right and left selective frame members that have different lengths and have bolt holes located at a same position in a width direction thereof,
wherein the component parts include front wheels, a seat, rear wheels, a rear axle, a controller and a motor,
the front frame assembly supports at least the front wheels, and
the center frame assembly supports the battery, and
the counterweight supports the controller, the rear wheels, the motor, and the rear axle.

3. A towing tractor comprising:
a frame that includes a front frame assembly and a center frame assembly, wherein the center frame assembly is connected to a rear part of the front frame assembly by bolts;
a counterweight that is connected to a rear part of the center frame assembly by bolts, and
a plurality of component parts supported by the frame, wherein
each of the front frame assembly and the center frame assembly includes a pair of right and left frame members that is selected from among a plurality of pairs of right and left selective frame members that have different lengths and have bolt holes located at a same position in a width direction thereof,
wherein the component parts include front wheels, a seat, rear wheels, a rear axle, a battery, a controller, and a motor,
the front frame assembly supports at least the front wheels, and
the center frame assembly supports the battery and the controller
the counterweight supports the seat, the rear wheels, the motor, and the rear axle.

* * * * *